United States Patent [19]
Capron

[11] 3,765,696
[45] Oct. 16, 1973

[54] CART

[76] Inventor: Richard C. Capron, R.D. No. 1, Broadalbin, N.Y. 12025

[22] Filed: Feb. 25, 1972

[21] Appl. No.: 229,539

[52] U.S. Cl. ............................................. 280/47.25
[51] Int. Cl. .............................................. B60b 1/02
[58] Field of Search ..................... 280/47.25, 47.26, 280/14

[56] References Cited
UNITED STATES PATENTS

| | | | |
|---|---|---|---|
| 2,990,190 | 6/1961 | Eriksen | 280/47.25 X |
| 2,425,107 | 8/1947 | Martin | 280/47.26 |
| 1,259,466 | 3/1918 | Turner | 280/47.25 |
| 1,527,973 | 3/1925 | Gilbert | 280/47.25 |
| 1,406,397 | 2/1922 | Lincoln | 280/47.25 X |
| 2,395,275 | 2/1946 | Jackson | 280/47.25 X |
| 2,950,924 | 8/1960 | Gantz | 280/14 |
| 3,141,681 | 7/1964 | Cedarstrand | 280/47.25 |
| 3,338,590 | 8/1967 | Gould et al. | 280/47.25 |

*Primary Examiner*—Leo Friaglia
*Assistant Examiner*—John A. Pekar

[57] ABSTRACT

A cart device for navigating most terrain. This device consists primarily of a body portion with side walls, an axile, a pair of wheels, a kick-stand, a tube member with detatchable handle means, the handle serving to manually pull or push the cart.

2 Claims, 3 Drawing Figures

Patented Oct. 16, 1973

3,765,696

CART

This invention relates to vehicles, and more particularly to a cart.

It is therefore the primary purpose of this invention to provide a cart for the transportation of children over terrain of all types in both summer and winter.

Another object of this invention is to provide a cart of the type described which will have wheels for summer use and will have ski members for traveling over snow and ice.

Another object of this invention is to provide a cart of the type described which will be of such construction, so as to enable the user to push or pull it through fields, up and down hills across shallow streams and will be adaptable for use on beaches.

A further object of this invention is to provide a cart which will require little effort for ascending and decending stairs and the structure will be such, that it will have a low center of gravity for maximum safety.

A still further object of the present invention is to provide a cart of the type described which will have the tubular handle member removable therefrom for compact storage and the device will also include a kick-stand to keep the child or children in a level position when the cart is at rest.

Other objects of the present invention are to provide a cart which is simple in design, inexpensive to manufacture, rugged in construction, easy to use and efficient in operation. These and other objects will be readily evident upon a study of the following specification and the accompanying drawing wherein.

Figure 2:
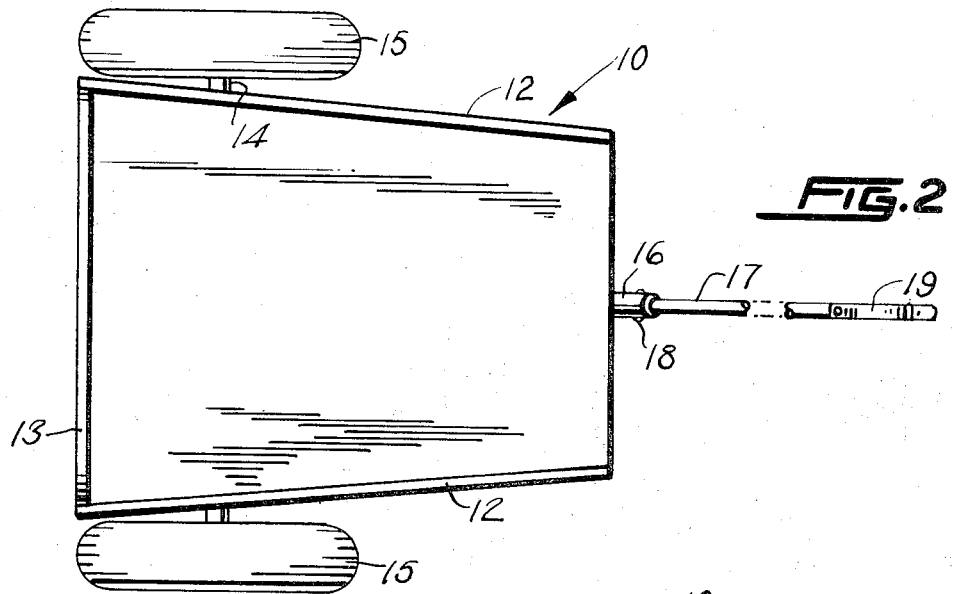
FIG. 2 is a top plan view of FIG. 1.
Figure 3:
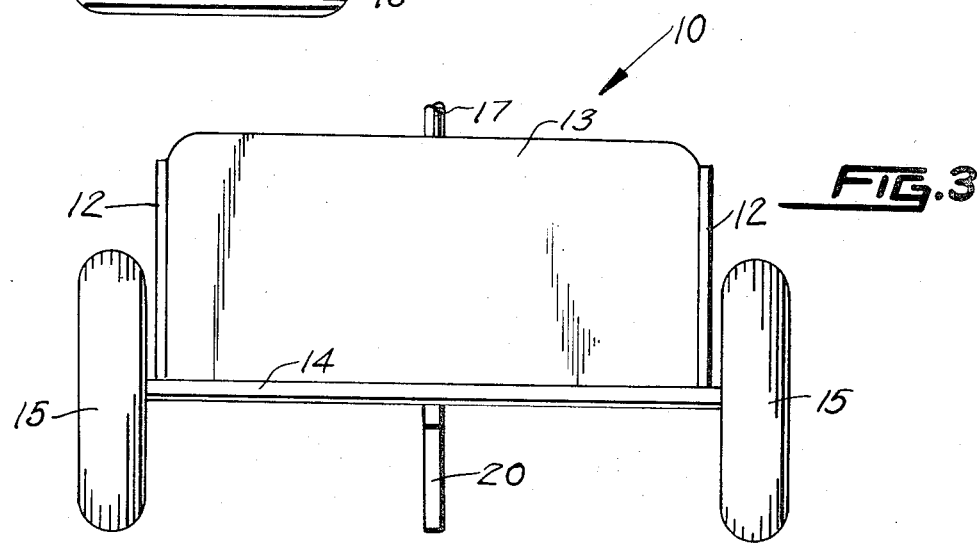
FIG. 3 is a fragmentary end view of FIG. 1. According to this invention, a cart 10 is shown to include a hollow base 11 which is fixedly secured between a pair of side walls.

As shown in FIG. 2 of the drawing, it is to be noted that the side walls 12 each comprises a straight flat panel and which extend in a forwardly converging direction.

Cart 10 also includes an end wall 13 which is secured fixedly between side walls 12. Secured in a suitable manner (not shown) to the underside of the base 11 is, an axile 14 which freely carries a wheel 15 at each end for navigating and supporting the device on various types of terrain.

Secured centrally to the bottom of base 11 in a suitable manner (not shown), is a tubular member 16 which removably receives a tubular handle 17, the handle 17 being secured within the upturn end of tubular member 16, by means of a transverse pin 18. A strap member 19 is secured at the outer extremity of the tubular handle 17 and provides a means for easily handling cart 10.

Figure 1:
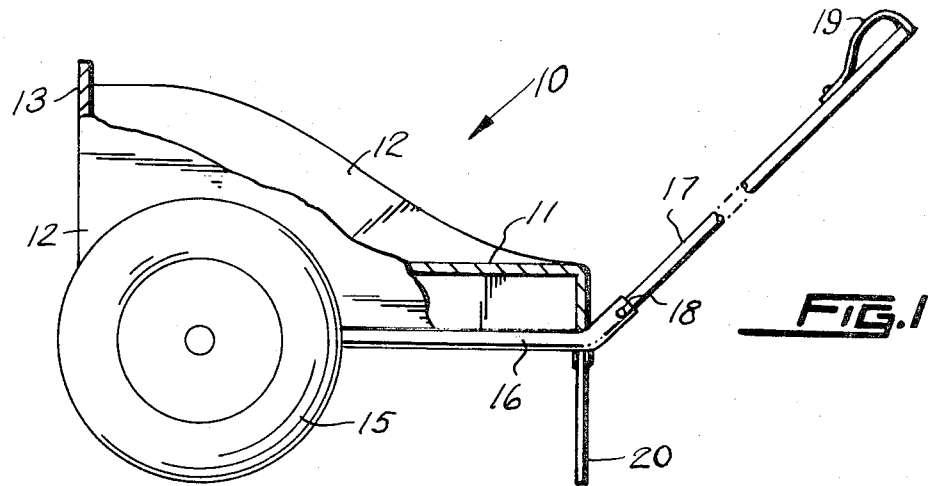
FIG. 1 is a side view of the present invention shown in elevation and partly broken away.

As shown in FIG. 1 of the drawing, it is to be noted that the strap handle 19, secured at its one end to the outer extremity of the handle 17 is secured at its opposite end along side and intermediate portion of the handle so as to form a loop therebetween.

It will be noted that a kick-stand 20 is carried and is fixedly secured to tubular member 16 in order that cart 10 will remain level when the child or children are seated therein when the cart 10 is at rest.

It shall further be noted that wheels 15 maybe removed from the axile 14 and skis (not shown) maybe readily placed thereon for navigating snow and ice.

What I now claim is:

1. A cart vehicle for transporting children, a hollow base member carried by said cart providing seat means for children, a pair of spaced apart side walls carried by said base member and an end wall for providing compartment means for children, axle means carried by said cart for the attachment of wheels in the summer time and for attachment of skis in the winter time, a central tubular member carried by said base member providing attachment means for a tubular handle, transverse pin means carried by said tubular member for securing said handle thereto and a kick stand member carried by said tubular member for supporting said cart in an upright position when at rest, said base member being tapered toward said handle member and said side walls being fixedly secured thereto in conjunction with said end wall thus defining said compartment means for seating children therein, and said tubular member fixedly secured to the underside of said base member, said base member carrying said axle on said wheels or skis, said tubular member extending upwards at the narrow side of said base to form insertion means for said tubular handle, said tubular handle being freely received within said upturned end of said tubular member and being secured therein by means of said transverse pin, said transverse pin being removable for compact storage of said cart when it is not in use, and a strap member being secured at its one end to an outer extremity of said tubular handle, the opposite end of said strap member being secured along a side of said handle so to form a loop therebetween and providing easy manipulation means for the cart by a user.

2. The combination according to claim 1, wherein said kick-stand member which is pivotably moved upwards and out of the way when said cart is in use, is fixedly secured to said tubular member secured to the bottom of said base and said kick-stand member enables said cart to remain level when children are seated therein and also provides stop means against said cart from rolling.

* * * * *